United States Patent
Weng

(10) Patent No.: US 10,166,999 B1
(45) Date of Patent: Jan. 1, 2019

(54) SURROUND SOUND BASED WARNING SYSTEM

(71) Applicant: Ambarella, Inc., Santa Clara, CA (US)

(72) Inventor: Ching-Yu Weng, Hsinchu (TW)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 15/893,842

(22) Filed: Feb. 12, 2018

(51) Int. Cl.
*B60W 50/14* (2012.01)
*H04R 5/02* (2006.01)
*H04S 7/00* (2006.01)

(52) U.S. Cl.
CPC .............. *B60W 50/14* (2013.01); *H04R 5/02* (2013.01); *H04S 7/302* (2013.01); *B60W 2050/143* (2013.01)

(58) Field of Classification Search
None
See application file for complete search history.

(56) References Cited

U.S. PATENT DOCUMENTS

| 2003/0209893 | A1* | 11/2003 | Breed .................. B60J 10/00 280/735 |
| 2008/0042812 | A1* | 2/2008 | Dunsmoir .......... G06K 9/00805 340/435 |
| 2016/0379621 | A1 | 12/2016 | Marti et al. |
| 2017/0213478 | A1 | 7/2017 | Kohn |
| 2017/0303037 | A1 | 10/2017 | Kobayashi et al. |
| 2018/0033307 | A1* | 2/2018 | Tayama ................. G08G 1/166 |

* cited by examiner

*Primary Examiner* — Antim G Shah
(74) *Attorney, Agent, or Firm* — Christopher P. Maiorana, PC

(57) ABSTRACT

An apparatus includes an interface and a processor. The interface may be configured to receive data readings generated by a plurality of sensors. The processor may be configured to perform a fusion operation on the data readings to detect an event, determine a location of the event with respect to a vehicle based on the data readings, convert the location to spatial audio data and generate an audio warning signal based on the spatial audio data. The sensors may generate video data as one of the data readings. The processor may perform video analysis on the video data to calculate measurements using a number of pixels to the event to calculate the location. The spatial audio data may be in a format compatible with a surround sound speaker system of the vehicle. The audio warning signal may indicate the location of the event using the surround sound speaker system.

15 Claims, 9 Drawing Sheets

US 10,166,999 B1

SURROUND SOUND BASED WARNING SYSTEM

FIELD OF THE INVENTION

The invention relates to detection systems generally and, more particularly, to a method and/or apparatus for implementing a surround sound based warning system.

BACKGROUND

Vehicles have many different types of audio warnings. It is often unclear what an audio warning refers to without a corresponding warning light (i.e., an icon displayed on the dashboard). Using warning lights can cause the eyes and attention of the driver to be distracted from the road in order to interpret the warning. Taking driver attention away from the road can reduce reaction times.

It would be desirable to implement a surround sound based warning system that increases the amount of time a driver has to react.

SUMMARY

The invention concerns an apparatus comprising an interface and a processor. The interface may be configured to receive data readings generated by a plurality of sensors. The processor may be configured to perform a fusion operation on the data readings from the plurality of sensors to detect an event, determine a location of the event with respect to a vehicle based on the data readings, convert the location to spatial audio data and generate an audio warning signal based on the spatial audio data. At least one of the sensors may generate video data as one of the data readings. The processor may perform video analysis on the video data to calculate measurements using a number of pixels to the event with respect to the vehicle to calculate the location. The spatial audio data may be in a format compatible with a surround sound speaker system of the vehicle. The audio warning signal may indicate the location of the event using the surround sound speaker system.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a surround sound based warning system that may (i) detect a real world event, (ii) locate an event with respect to a vehicle, (iii) implement sensor fusion, (iv) implement computer vision, (v) convert location information to surround sound audio, (vi) indicate the location of an event, (vii) indicate a direction and a distance to an event and/or (viii) be implemented as one or more integrated circuits.

Figure 1:
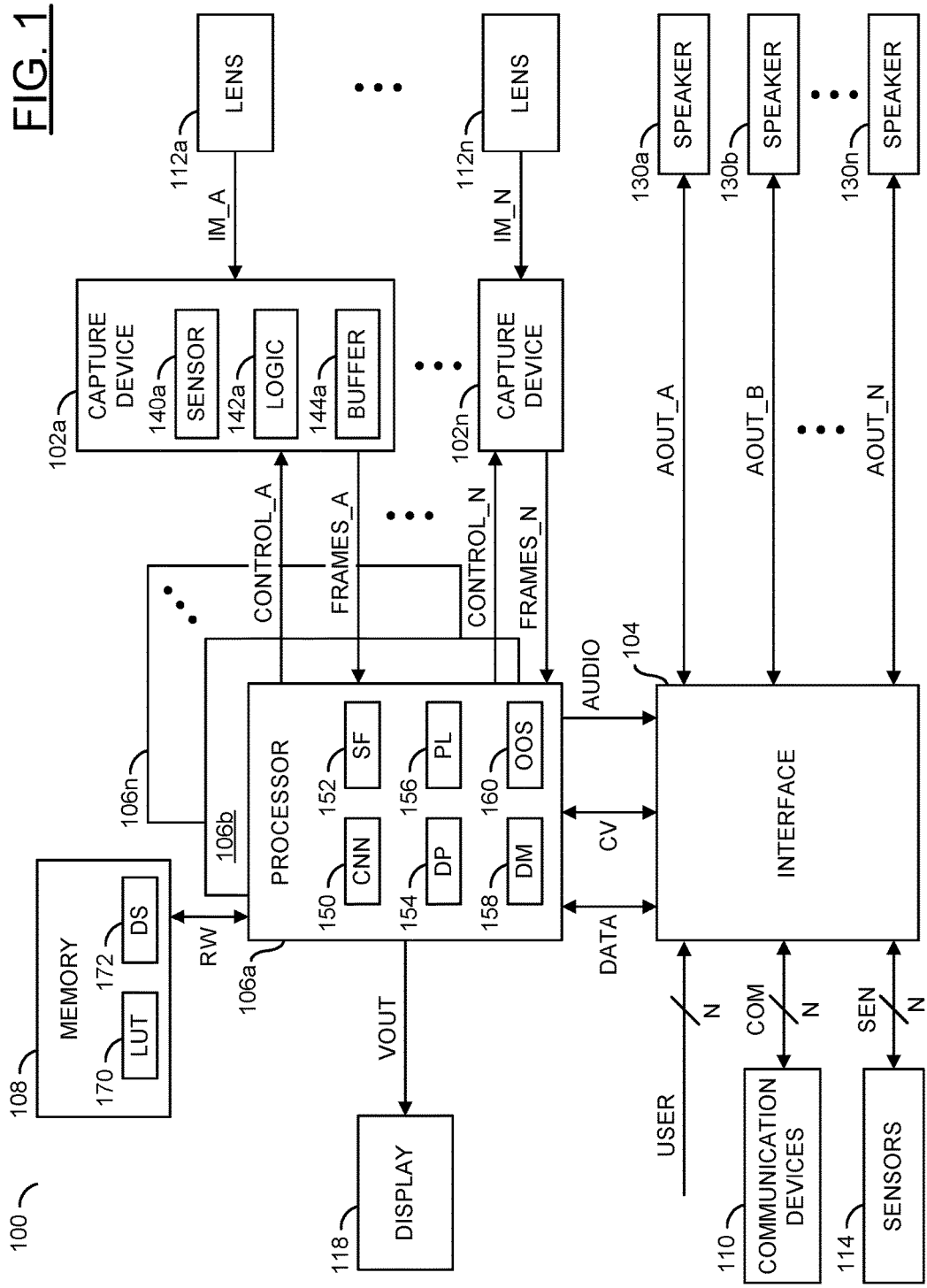
FIG. 1 is a diagram illustrating an example embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 118 and/or blocks (or circuits) 130a-130n. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 118 may implement a display. The circuits 130a-130n may implement speakers. The apparatus 100 may comprise other components (not shown). The number, type and/or arrangement of the components of the apparatus 100 may be varied according to the design criteria of a particular implementation.

In various embodiments of the apparatus 100, the components 102a-130n may be implemented as a distributed camera system 100. In the distributed system embodiment of the apparatus 100, each component may be implemented separately throughout an installation location (e.g., such as a vehicle). In some embodiments of the apparatus 100, the components 102a-130n may be implemented on a printed circuit board (e.g., a single module). In the single module embodiment, each component may be connected to a single module (e.g., such as a circuit board on a small device such as a drone). In some embodiments, some of the components 102a-130n may be implemented on a single module and some of the components 102a-130n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, some of the components 102a-130n may be implemented as part of another one of the components 102a-130n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may potentially point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 60a-60n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition the video frames). The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., AUDIO), a signal (e.g., COM), a signal (e.g., SEN), signals (e.g., AOUT_A-AOUT_N) and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal AUDIO may represent audio data generated by the processors 106a-106n for the various vehicle speakers 130a-130n. The signals AOUT_A-AOUT_N may represent audio data signals specific to each of a respective one of the speakers 130a-130n. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or to process information. The processors 106a-106n may each be configured to receive the signals FRAMES_A-FRAMES_N, transmit the signal AUDIO, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal AUDIO may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The speakers 130a-130n may each receive an audio signal (e.g., AOUT_A-AOUT_N). The signals AOUT_A-AOUT_N may represent audio signals (e.g., a volume and/or a phase) that may be reproduced by each one of the speakers 130a-130n. By placing the speakers 130a-130n throughout the vehicle 50, and tailoring the audio signals AOUT_A-AOUT_N to specific directional locations (e.g., object based), the speakers 130a-130n may provide audible indications of potential hazards to a driver of vehicle.

The speakers 130a-130n may implement a surround sound audio system. The speakers 130a-130n may be installed in various locations of an interior of a vehicle. Generally, the speakers 130a-130n may be located to provide a full coverage for a 360 degree sound field. The speaker system 130a-130n may be configured to read and/or playback various spatial audio formats (e.g., Dolby Atmos, ambisonics, multi-channel, object-oriented, etc.). The processors 106a-106n may be configured to generate the signal AUDIO providing a spatial audio in a format compatible with the speakers 130a-130n. For example, the interface 104 may convert the spatial audio data from the signal AUDIO to the signals AOUT_A-AOUT_N to enable playback of the spatial audio data from the speakers 130a-130n. The implementation of the speakers 130a-130n may be varied according to the design criteria of a particular implementation.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making.

The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal AUDIO. The decision making module 158 may be configured to use the information from the computer vision operations and/or the sensor fusion module 152 to detect events and/or determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
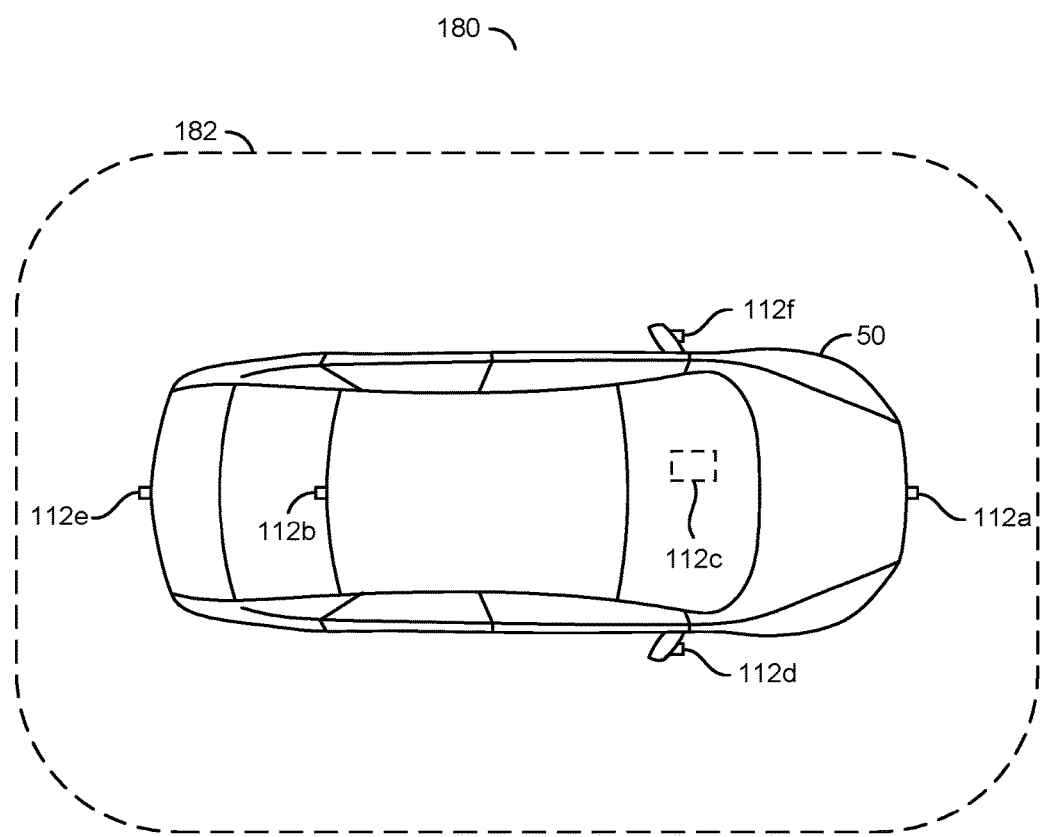
FIG. 2 is a diagram illustrating a top view of a vehicle implementing the system.

Referring to FIG. 2, a diagram illustrating a top view 180 of a vehicle 50 is shown. The lens 112a is shown mounted toward a front area of the vehicle 50. The lens 112b is shown mounted toward a top rear area of the vehicle 50. The lens 112c is shown mounted in an interior of the vehicle 50. The lens 112d is shown mounted toward a right area of the vehicle 50. The lens 112e is shown mounted toward a rear area of the vehicle 50. The lens 112f is shown mounted toward a left area of the vehicle 50.

An area 182 is shown. The lenses 112a-112n (and the corresponding capture devices 102a-102n) may be configured to enable the apparatus 100 to capture video data of the area 182. For example, the area 182 may be a visual range around the vehicle 50. The apparatus 100 may be configured to utilize the video data captured and/or data from the sensors 114 to detect an event in the area 182. The apparatus 100 may use the surround speaker system 130a-130n to provide an audio warning of detected events in the area 182. In some embodiments, the area 182 may be a 360 degree field of view surrounding the vehicle 50. A size of the area 182 in proportion to a size of the vehicle 50 in the example shown may not be representative of an actual size of the area 182. A radius of the area 182 may be varied based on the capability of the capture devices 102a-102n (e.g., resolution captured, zoom capability, image quality, etc.) and/or a sensitivity range of the sensors 114).

Figure 3:
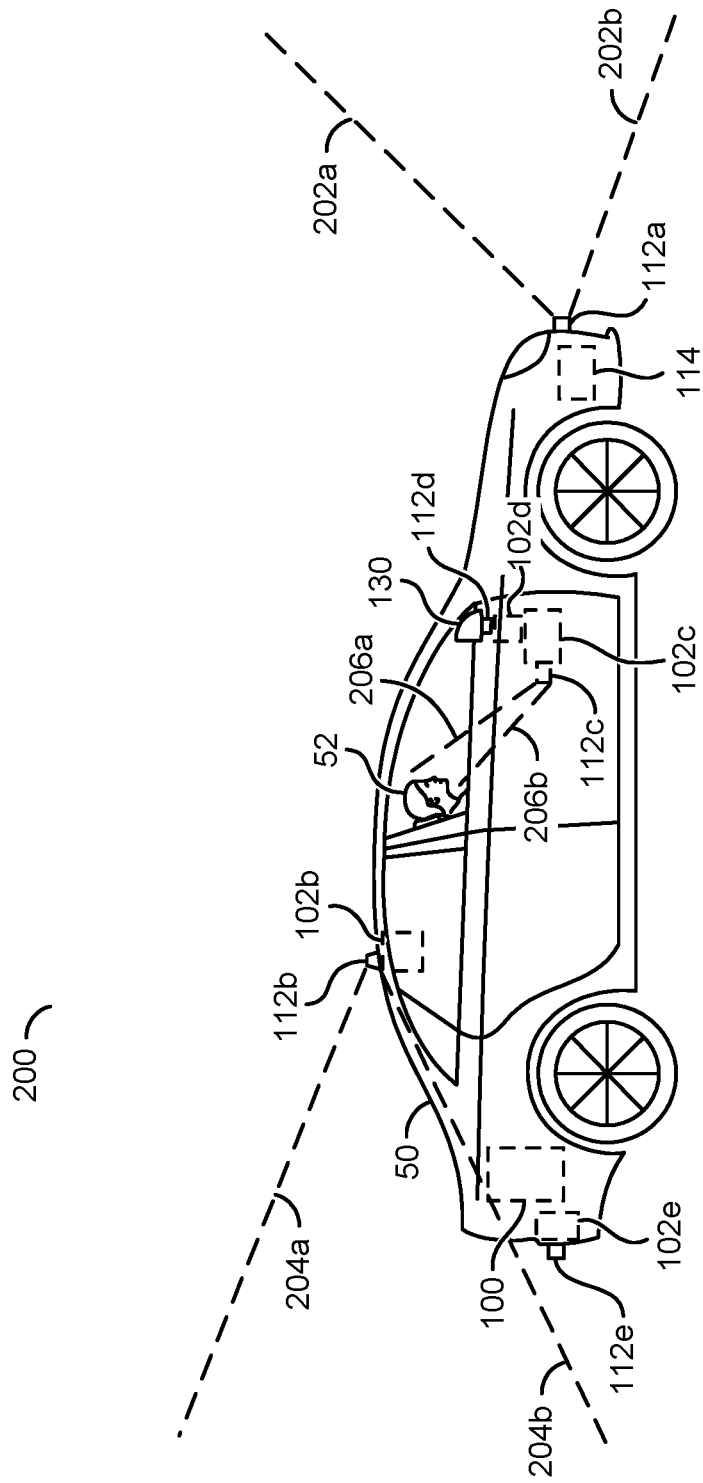
FIG. 3 is a diagram illustrating a side view of the various cameras of the system shown in the context of a vehicle.

Referring to FIG. 3, a diagram illustrating a side view 200 of the vehicle 50 implementing camera systems capturing various views surrounding the vehicle 50 is shown. A driver 52 is shown operating the vehicle 50. The lens 112a is shown capturing video between lines 202a-202b. The lines 202a-202b may represent a field of view of the lens 112a. The lens 112b is shown capturing video between lines 204a-204b. The lines 204a-204b may represent a field of view of the lens 112b. The lens 112c is shown capturing video between lines 206a-206b. The lines 206a-206b may represent a field of view of the lens 112c. The lens 102c may be positioned to capture video of a face of the driver 52. The lens 112e is shown.

The electronics of the system 100 are shown mounted in a rear area of the vehicle 50. The particular location of the electronics of the system 100 may be varied to meet the design criteria of a particular implementation. The particular location of the lenses 112a-112n may be varied. The lenses 112a-112n (and the corresponding capture devices 102a-102n) may be positioned around the vehicle 50 to provide various views of an area near the vehicle 50 (e.g., a surround view, a 360 degree field of view, spherical view, etc.). The sensors 114 is shown near the front of the vehicle 50. The particular location of the sensors 114, and the various other sensors, may be varied to meet the design criteria of a particular implementation.

Figure 4:
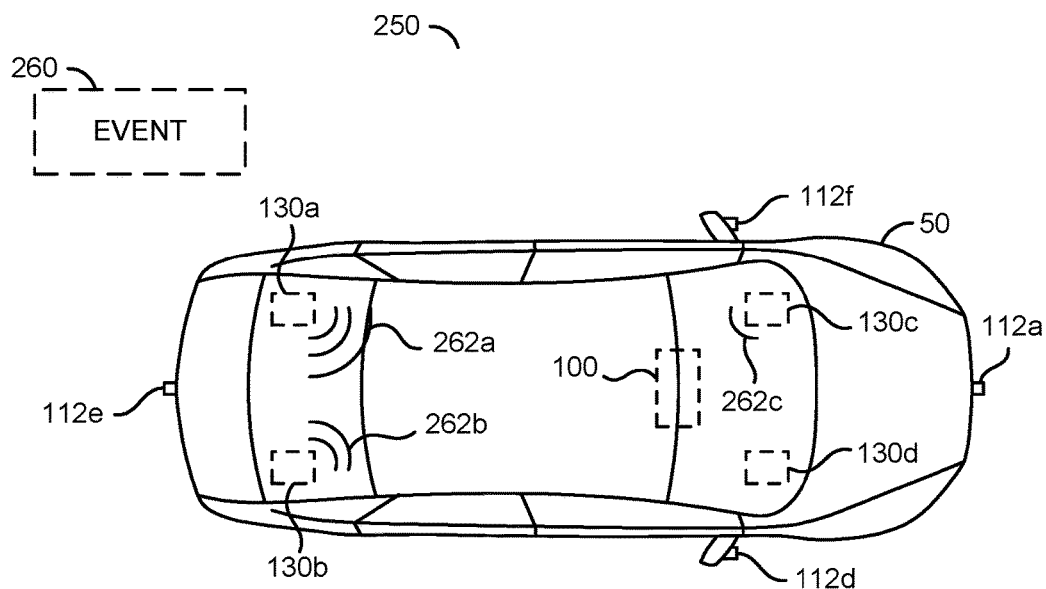
FIG. 4 is a diagram illustrating an example event detection using a surround sound speaker system.

Referring to FIG. 4, a diagram illustrating a top view 250 of an example detection of an event 260 using a surround sound speaker system 130a-130d is shown. The event 260 represents either a physical object approaching the vehicle 50, or a calculated event determined using the various methods described in connection with FIGS. 7-10. The event 260 is shown near the left rear portion of the vehicle 50. In an example, the event 260 may occur in a blind spot of the driver 52.

The event 260 may be detected by the apparatus 100. The apparatus 100 may detect the event 260 using a combination of computer vision and/or data from the sensors 114. For example, the sensor fusion module 152 may be configured to receive computer vision results from the CNN module 150 and/or sensor data from the sensors 114. The apparatus 100 may implement sensor fusion to detect objects and/or interpret the environment. The apparatus 100 may determine whether the object detected is an event that should be brought to the attention of the driver 52. In an example, the event 260 may be a vehicle in a blind spot of the vehicle 50. In another example, the event 260 may be an object behind the vehicle 50 when driving in reverse. In yet another example, the event 260 may be another vehicle on a collision course with the vehicle 50. In still another example, the event 260 may be a pedestrian and/or an animal near the vehicle 50. The event 260 may comprise another vehicle closer than a pre-determined distance to the vehicle 50 and/or a pre-determined time to collision (e.g., another vehicle rapidly approaching the vehicle 50). The sensor fusion module 152 may determine a type (e.g., classification) for the event 260. For example, the event 260 may be classified as a vehicle approaching, a pedestrian crossing, an object in a blind spot, etc. The type of event 260 may be varied according to the design criteria of a particular implementation.

The speaker 130a, shown near the left rear of the vehicle 50, is shown producing sound waves 262a. The speaker 130b, located in the right rear portion of the vehicle 50, is shown producing sound waves 262b. The speaker 130c is shown in the left front portion of the vehicle 50. The speaker 130c is shown producing sound waves 262c. The speaker 130d is shown in the right front of the vehicle 50. The speaker 130d is shown not producing sound waves.

The sound waves 262a are illustrated to be stronger than the sound waves 262b and the sound waves 262c. In the example shown, the sound waves 262a-262b corresponding to the rear of the vehicle are shown as stronger (e.g., louder) than the sound waves 262c corresponding to the front end of the vehicle 50. Similarly, the sound waves 262a corresponding to the driver side of the vehicle 50 are shown as stronger than the sound waves 262b corresponding to the passenger side of the vehicle 50. The speaker 130d that is farthest away from the event 260 is not shown producing sound waves. The strongest sound waves 262a may indicate that the event 260 is near the left rear of the vehicle 50. The amplitude, frequency and/or tone of the sound waves 262a-262c may be varied according to the design criteria of a particular implementation.

Generally, the sound waves 262a-262c may be generated to correspond with a location of the event 260 with respect to the vehicle 50. The sound field generated by the speakers 130a-130n may be implemented to provide a notification to the driver 52 of the direction and/or location of the event 260. In the example shown, the speaker 130a may be the closest of the speakers 130a-130d to the event 260. However, other speakers (e.g., the speaker 130c and the speaker 130c) may also generate audio to enable a 3D and/or stereo audio effect. For example, generating some audio from the front left speaker 130c may be useful to create a sound field that notifies the driver 52 that the event 260 is to the left and rear of the vehicle 50.

Figure 5:
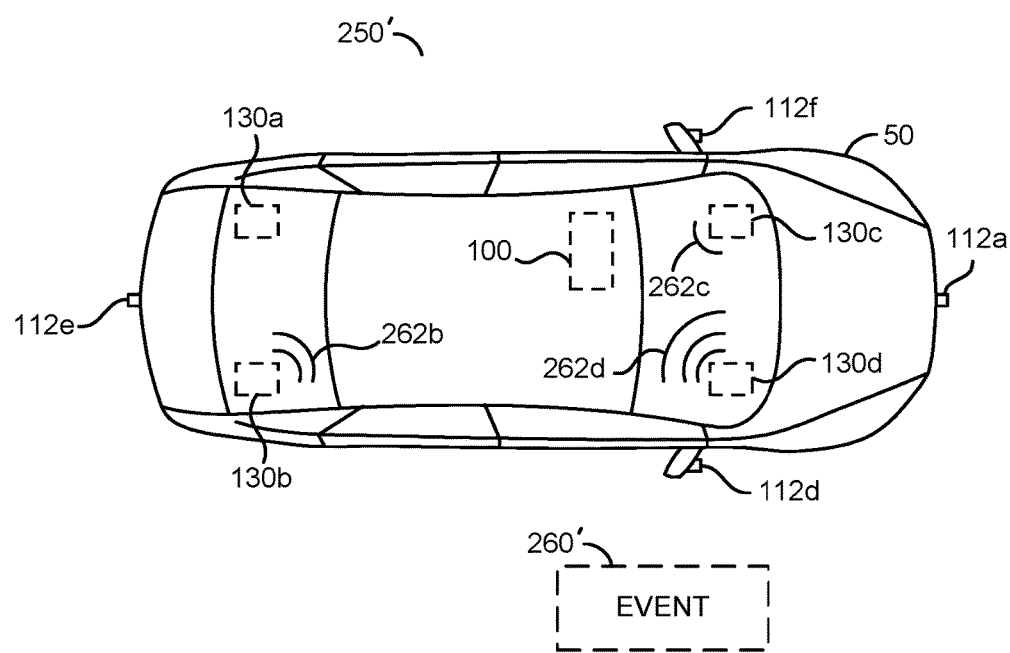
FIG. 5 is a diagram illustrating another example event detection using a surround sound speaker system.

Referring to FIG. 5, a diagram illustrating another top view 250' of an example detection of the event 260' using the surround sound speaker system 130a-130d is shown. The event 260' is shown toward the right portion of the vehicle 50, near the front. The speaker 130a is shown not producing sound waves. Alternately, the speaker 130a may produce subdued sound waves. The speaker 130b is shown producing the sound waves 262b'. The speaker 130c is shown producing the sound waves 262c'. The speaker 130d is shown producing the sound waves 262d'.

The sound waves 262d' are shown to be the strongest sound waves. The sound waves 262b' are shown to be the next strongest sound waves. The sound waves 262c' are shown to be the next strongest sound waves. With the configuration shown in FIG. 5, more sound waves 262d' are shown from the right front of the vehicle 50, which is consistent with the event 260' being detected on the right front of the vehicle 50.

Generally, the sound waves 262b'-262c' may be generated in response to the signals AOUT_A-AOUT_N. For example, the processors 106a-106n may generate the signal AUDIO comprising spatial audio data. The spatial audio data may provide information corresponding to the location of the event 260' with respect to the vehicle 50. In some embodiments, the interface 104 may convert the signal AUDIO to the signals AOUT_A-AOUT_N. The signals AOUT_A-AOUT_N may be configured to provide the spatial audio data for the corresponding one of the speakers 130a-130n. In the example shown, the signal AOUT_A may provide spatial audio data for the speaker 130a to not generate sound waves, and the signal AOUT_D may provide spatial audio data for the speaker 130d to generate the strong sound waves 262d.

Figure 6:
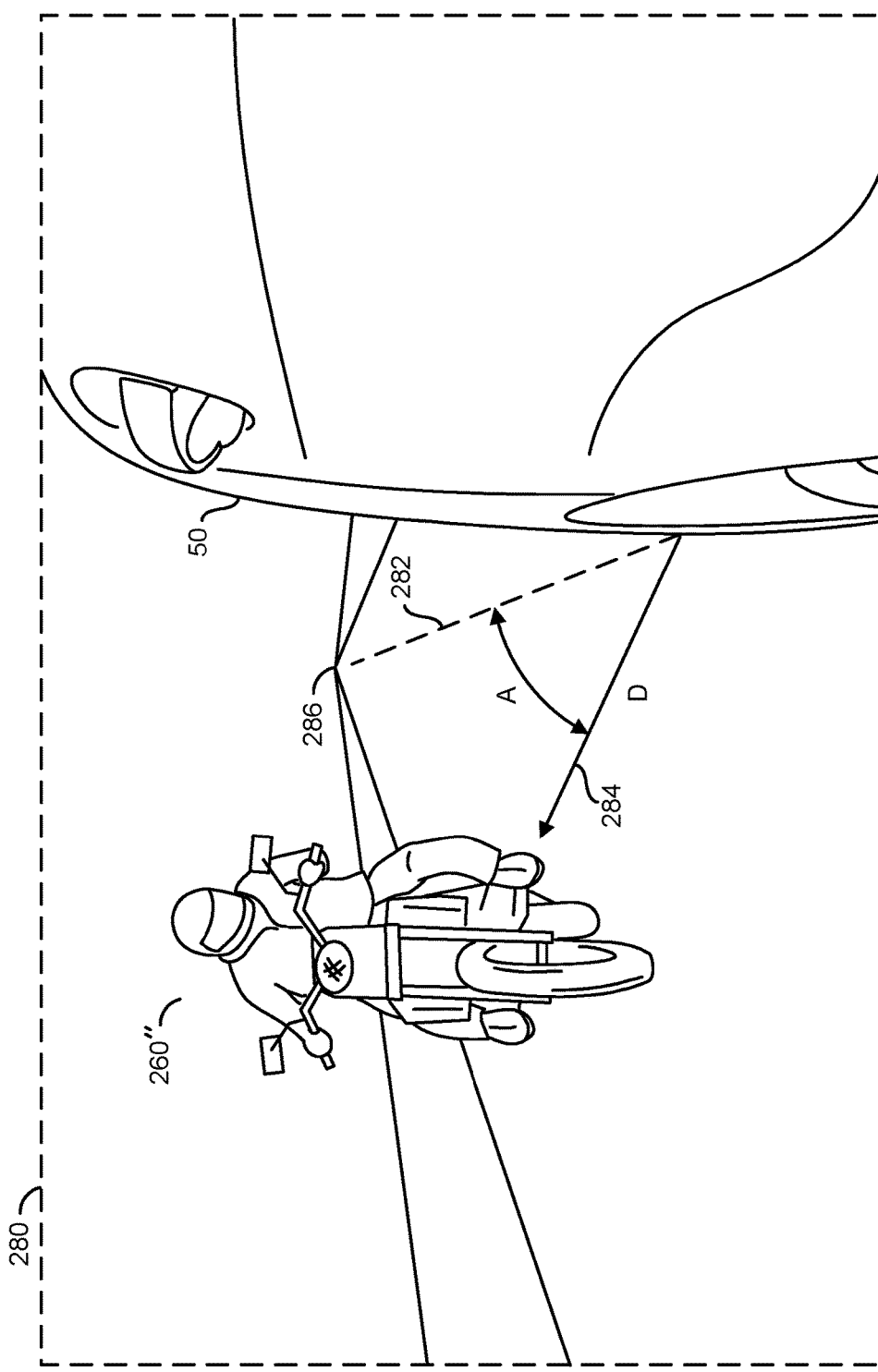
FIG. 6 is a diagram illustrating detecting a location of an event in a video frame.

Referring to FIG. 6, a diagram illustrating detecting a location of the event 260" in a video frame 280 is shown. The video frame 280 may be one of the video frames generated by the capture devices 102a-102n (e.g., from the signals FRAMES_A-FRAMES_N) and/or analyzed by the CNN module 150. A pictorial view of the object 260" (e.g., the event) is shown. In the example shown in FIG. 6, the event 260" may be a motorcycle driver approaching the vehicle 50. The vehicle 50 is shown in the video frame 280. For example, the video frame 280 may be a video frame captured using the lens 112d directed towards the rear of the vehicle 50 (e.g., a view of a possible blind spot). In the example video frame 280, the vehicle 50 and the motorcycle 260" may be traveling in the same direction on a road 286.

The processors 106a-106n may be configured to analyze the video frame 280 to detect objects and/or determine whether a scenario should be considered the event 260". In one example, the motorcycle 260" may be detected by the processors 106a-106n but may not be in a location determined to be noteworthy for the driver 52 (e.g., if the motorcycle 260" is at a distance that is unlikely to result in a collision and/or not approaching the vehicle 50). In another example, the motorcycle 260" may be detected by the processors 106a-106n and may be determined to be noteworthy for the driver 52 (e.g., if the motorcycle 260" is in a blind spot and/or on a collision course with the vehicle 50).

A line 282 and a line 284 are shown. The line 282 may represent a reference for the location of the vehicle 50 in the video frame 280. The line 284 may represent a distance D of the vehicle 50 to the motorcycle 260". An angle A is shown. The angle A may represent an angle between the vehicle 50 and the motorcycle 260". For example, the angle A and the distance D may represent the location of the motorcycle 260" with respect to the vehicle 50 determined by the processors 106a-106n using the computer vision operations.

The computer vision operations performed by the processors 106a-106n may be configured to analyze the pixels and/or features of the video frame 280. By analyzing the number and/or characteristics (e.g., color, arrangement, etc.) of the pixels of the video frame 280, the processors 106a-106n may be configured to determine the distance D and/or the angle A of the motorcycle 260" with respect to the vehicle 50 (e.g., determine the distance relationships between the vehicle 50 and the motorcycle 260"). The sensor fusion module 152 may further use sensor data received from the sensors 114 in addition to the computer vision results to verify and/or enhance the determination of the location of the motorcycle 260". In an example, the processors 106a-106n may compare the results of the computer vision (e.g., location coordinates of the motorcycle 260" determined from the video frame 280) with the location determined using the sensors 114.

Based on the location of the motorcycle 260", the processors 106a-106n (e.g., the driver policy module 154 and/or the decision module 158) may decide whether to generate the signal AUDIO. The signal AUDIO (e.g., and the signals AOUT_A-AOUT_N) may be generated to notify the driver 52 about the event 260". The signal AUDIO may be generated to map the location of the event 260" to a spatial audio effect capability of the speakers 130a-130n. The spatial audio effect capability of the speakers 130a-130n may be used to represent a direction and/or distance of the event 260". In an example, if the angle A is sufficient to indicate that the event 260" is within the proper lane of the road 286, the audio indication may not be presented. Alternately, a soothing audio signal, indicating that the event 260" is within tolerable limits, may be presented. In another example, if the event 260" is in a blind spot of the driver 52, the audio presented may be a loud beep. In yet another example, if the event 260" is determined to be a potential collision, the loud alert may be presented.

Generally, the audio generated by the speakers 130a-130n may be louder when the event 260" is determined to be urgent. For example, if the event 260" is determined to need immediate attention, the sound waves 262a-262n may be loud. The loudness may increase as the event 260" approaches the vehicle 50. The audio generated by the speakers 130a-130n may change as the event 260" changes. For example, if the motorcycle 260" is passing the vehicle 50, the concentration of the sound field may move from the rear of the vehicle 50, to the side of the vehicle 50, to the front of the vehicle 50 and then fade out as the motorcycle 260" pulls away from the vehicle 50 (e.g., the audio warning may be played back continuously while the motorcycle 260" is in the blind spot and/or the audio warning may be adjusted in real-time in response to the movements of the motorcycle 260"). Similarly, tone and/or frequency of the spatial audio may be adjusted in response to the type, urgency (e.g., amount of risk) and/or location of the event 260". A volume and/or a phase for each of the speakers 130a-130n may be provided in the signals AOUT_A-AOUT_N. For example, an amount of volume may be increased as an amount of risk caused by the event 260" is increased (e.g., louder volume as the speed of the motorcycle 260" increases and/or as the distance decreases).

Figure 7:
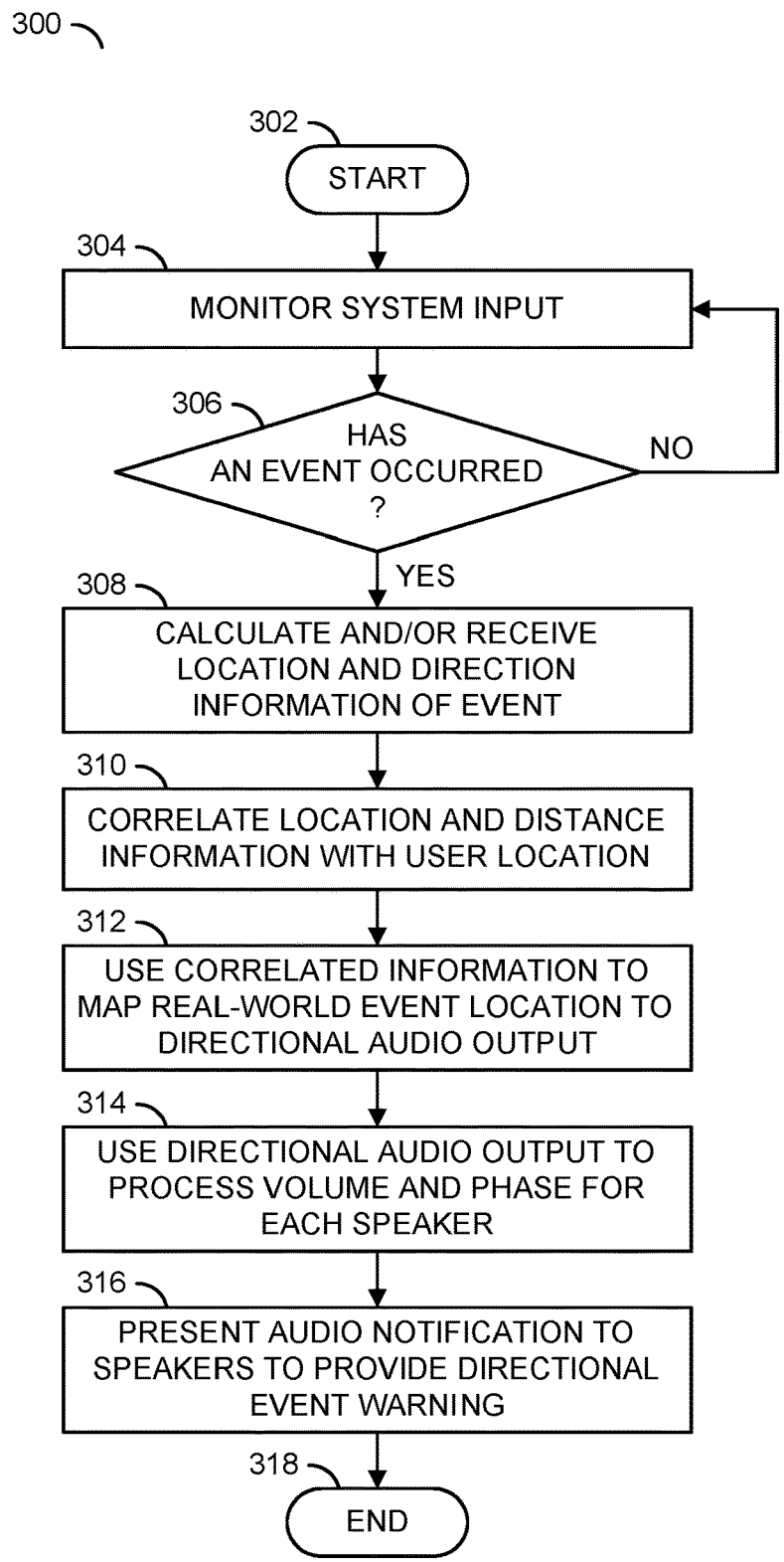
FIG. 7 is a flow diagram illustrating a method for providing a directional audio warning.

Referring to FIG. 7, a flow diagram illustrating a method 300 for providing the directional audio warning is shown. The method 300 generally comprises a step (or state) 302, a step (or state) 304, a decision step (or state) 306, a step (or state) 308, a step (or state) 310, a step (or state) 312, a step (or state) 314, a step (or state) 316, and a step (or state) 318. In some embodiments, the steps 302-318 may be implemented by the processors 106a-106n operating in response to computer readable and/or executable code.

The step 302 may be a start step for the method 300. The step 304 may monitor a system input (e.g., from the capture devices 102a-102n, the sensors 114 and/or the communication devices 110). The decision step 306 may determine if an event (e.g., the event 260) has occurred. If not, the method 300 moves back to the step 304. If so, the method 300 moves to the step 308.

The step 308 may calculate and/or receive location and/or direction information of the event. Next, the step 310 may correlate location and/or distance information with a current user location within the vehicle 50. For example, the sensors 114 may implement GPS/GNSS and/or an advanced driver assistance system (ADAS) digital map to determine the current location of the vehicle 50. Next, the step 312 may use the correlated information to map real-world event locations to generate the directional audio output signals AOUT_A-AOUT_N. Next, the step 314 may use the directional audio output signals AOUT_A-AOUT_N to process volume and/or phase for each of the speakers 130a-130n. Next, the step 316 presents audio notifications (e.g., within the output signals AOUT_A-AOUT_N) to the speakers 130a-130n to provide directional event warnings to the driver 52. Next, the step 318 ends the method 300.

Figure 8:
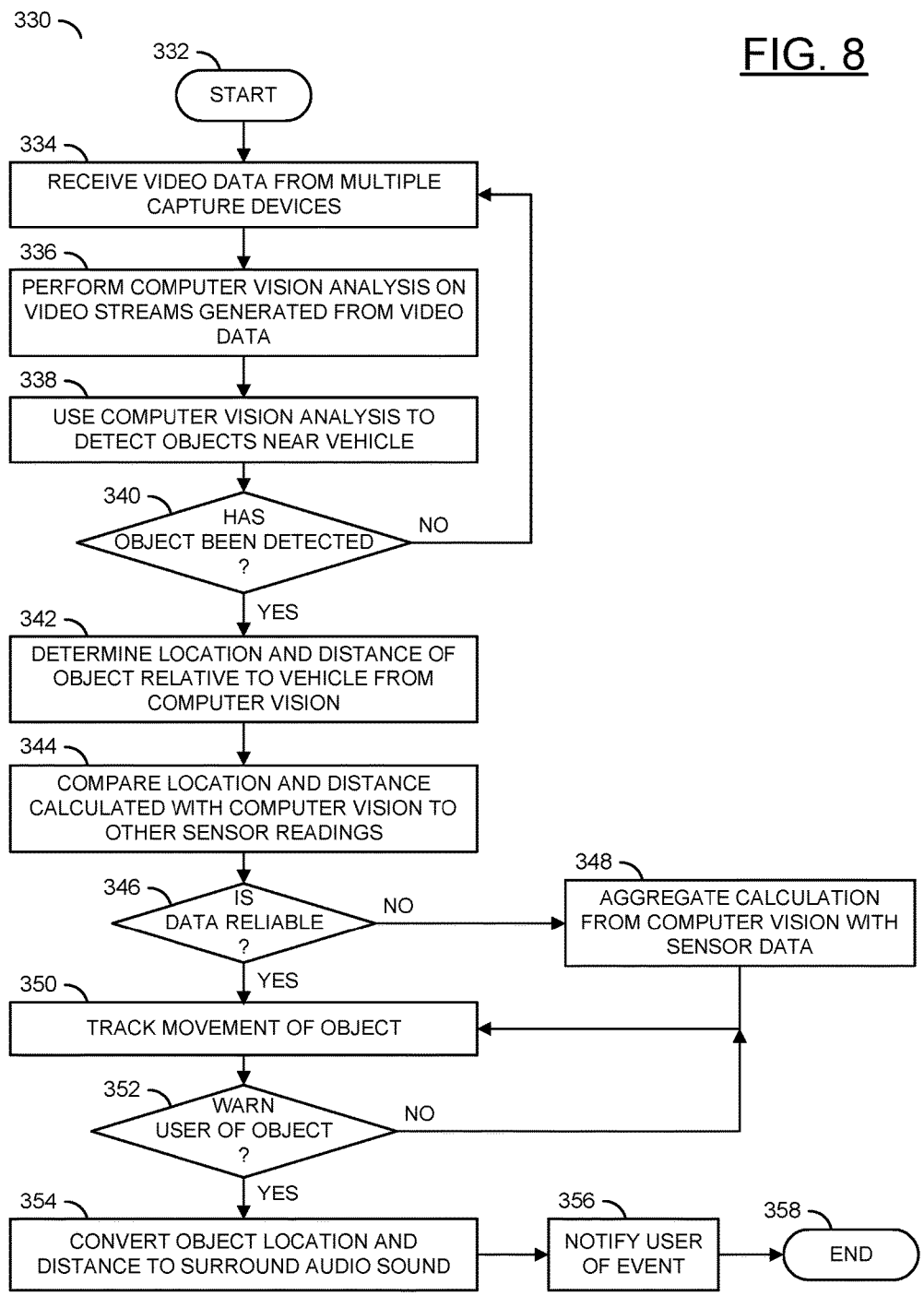
FIG. 8 is a flow diagram illustrating a method for tracking an event using computer vision.

Referring to FIG. 8, a flow diagram illustrating a method 330 for tracking an event using computer vision is shown. The method 330 generally comprises a step (or state) 332, a step (or state) 334, a step (or state) 336, a step (or state) 338, a decision step (or state) 340, a step (or state) 342, a step (or state) 344, a decision step (or state) 346, a step (or state) 348, a step (or state) 350, a decision step (or state) 352, a step (or state) 354, a step (or state) 356, and a step (or state) 358. In some embodiments, the steps 332-358 may be implemented by the processors 106a-106n operating in response to computer readable and/or executable code.

The step 332 may be a start step for the method 330. The step 334 may receive video data from multiple (e.g., two or more) of the capture devices 102a-102n. Next, the step 336 may perform computer vision analysis on the video streams (e.g., FRAMES_A-FRAMES_N) generated from the video data. Next, the step 338 may use computer vision analysis to detect objects near the vehicle 50. Next, the method 330 may move to the decision step 340.

The decision step 340 may determine if an object has been detected. If not, the method 330 moves back to the step 334. If so, the method 330 moves to the step 342. The step 342 may determine a location and/or a distance of objects relative to the vehicle 50 using computer vision. Next, the step 344 uses computer vision to compare the location and/or distance calculated in step 342 to other sensor readings (e.g., using sensor fusion). Next, the method 330 may move to the decision step 346.

The decision step 346 determines if the data is reliable. If not, the method 330 moves to the step 348. If so, the method 330 moves to the step 350. The step 348 may aggregate (e.g., cross-reference, compare, etc.) calculation(s) determined using computer vision with results from sensor data. Next, the step 348 moves to the step 350. The step 350 tracks movement of the object. Next, the method 330 may move to the decision step 352.

The decision step 352 determines whether it is appropriate to warn a user of an object. If not, the method 330 moves back to the step 350. If so, the method 330 moves to the step 354. The step 354 converts an object location and/or distance into a surround audio sound signal (on the output signals AOUT_A-AOUT_N). Next, the method 330 moves to the step 356 which notifies the user of an event through sounds presented by the speakers 130a-130n through the output signals AOUT_A-AOUT_N. The step 358 ends the method 330.

In some scenarios, computer vision may be unreliable (e.g., fog, heavy rain, snow and ice on the lenses 112a-112n, etc.). The processors 106a-106n may use a combination of computer vision results and/or sensor readings. In one example, the sensors 114 may be used to verify and/or enhance the results determined using computer vision. In another example, the computer vision results may be used to calibrate the sensors 114.

Figure 9:
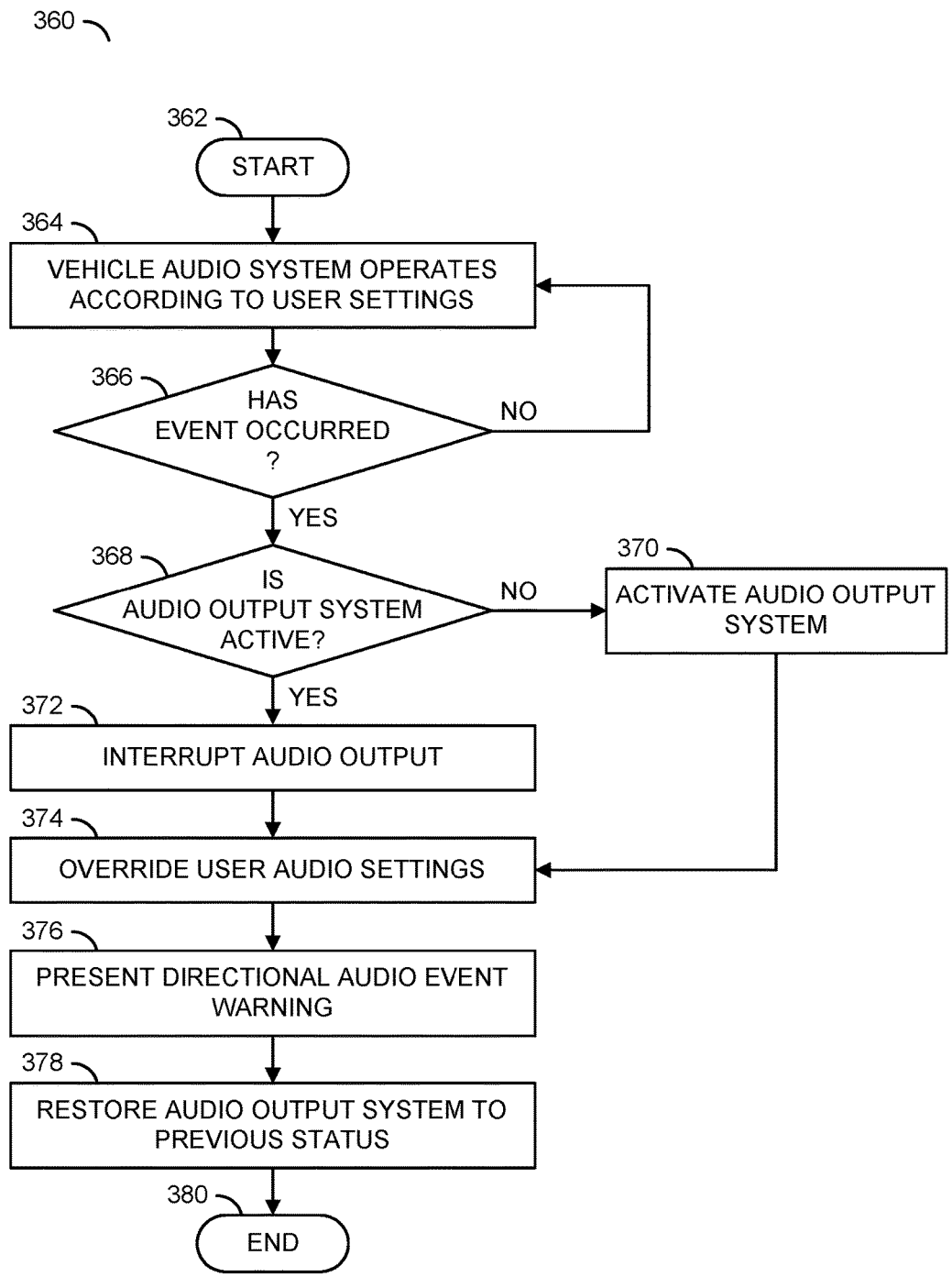
FIG. 9 is a flow diagram illustrating a method for overriding an audio output system to present a directional audio warning.

Referring to FIG. 9, a flow diagram illustrating a method 360 for overriding an audio output system to present a directional audio warning is shown. The method 360 generally comprises a step (or state) 362, a step (or state) 364, a decision step (or state) 366, a decision step (or state) 368, a step (or state) 370, a step (or state) 372, a step (or state) 374, a step (or state) 376, a step (or state) 378, and a step (or state) 380. In some embodiments, the steps 362-380 may be implemented by the processors 106a-106n operating in response to computer readable and/or executable code.

The step 362 may be a start step for the method 360. In the step 364, the vehicle audio system 130a-130n may be operating according to user settings (e.g., controlled using an infotainment system, a paired smartphone, a user interface, etc.). Next, the decision step 366 determines if an event has occurred (e.g., the event 260). If not, the method 360 moves back to the state 364. If so, the method 360 moves to the decision step 368.

The decision step 368 determines whether the audio output system 130a-130n is active. If not, the method 360 moves to the step 370. The step 370 activates the audio output system 130a-130n. Next, the method 360 moves to the step 374. In the decision step 368, if the audio output system 130a-130n is active, the method 360 moves to the step 372. The step 372 interrupts the current audio output. Next, the method 360 may move to the step 374.

The step 374 overrides the user audio settings. Next, the step 376 presents a directional audio event warning (on the output signals AOUT_A-AOUT_N). Next, the step 378 restores the audio output system to the previous status. For example, the apparatus 100 may be configured to over-ride and/or activate the surround speaker system 130a-130n to generate the audio warning to the driver 52 and/or ensure the warning is audible. The state 380 ends the method 360.

Figure 10:
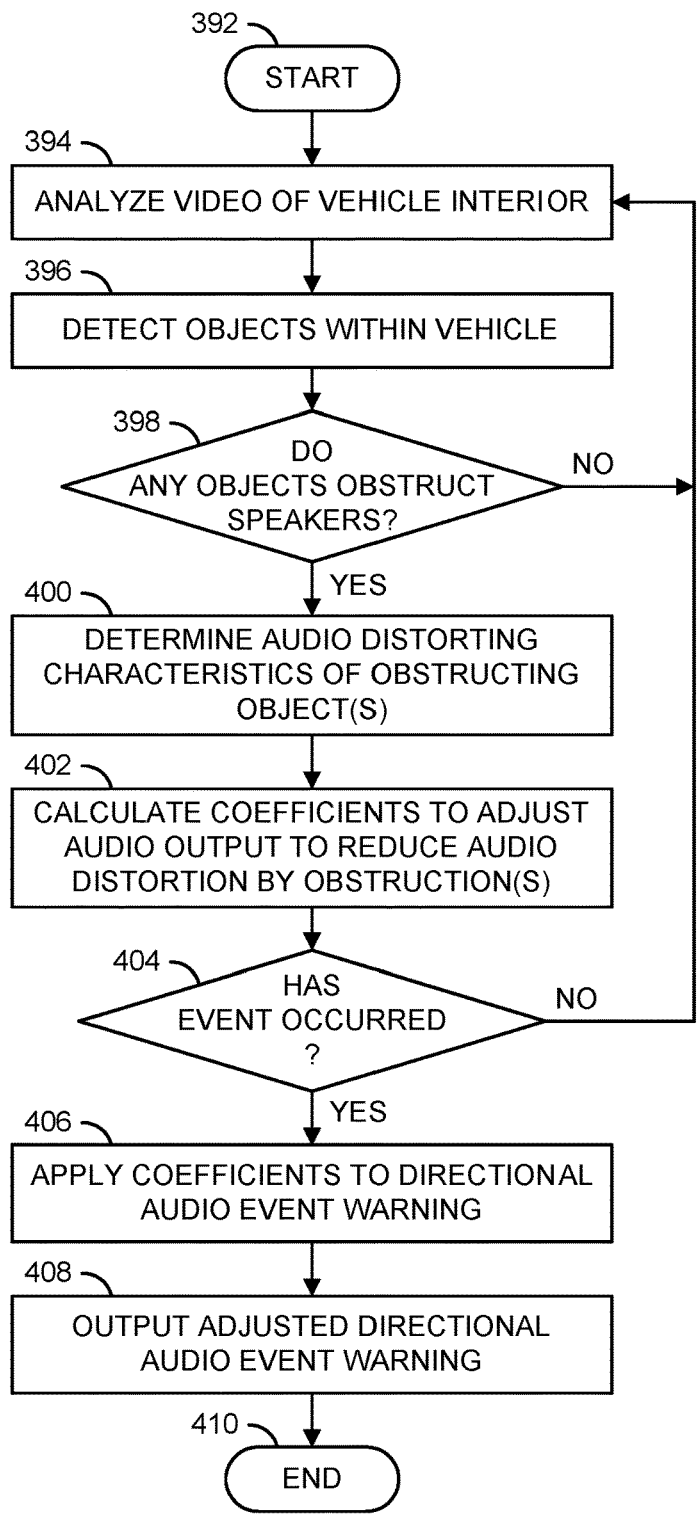
FIG. 10 is a flow diagram illustrating a method for adjusting a directional audio warning in response to speaker obstructions.

Referring to FIG. 10, a flow diagram illustrating a method 390 for adjusting the directional audio warning in response to speaker obstructions is shown. The method 390 generally comprises a step (or state) 392, a step (or state) 394, a step (or state) 396, a decision step (or state) 398, a step (or state) 400, a step (or state) 402, a decision step (or state) 404, a step (or state) 406, a step (or state) 408, and a step (or state) 410. In some embodiments, the steps 392-410 may be implemented by the processors 106a-106n operating in response to computer readable and/or executable code.

The step 392 may be a start step of the method 390. The step 394 may analyze video of an interior of the vehicle 50. For example, the lens 112c may capture an interior of the vehicle 50. Additional lenses 112a-112n may be implemented inside the vehicle 50 to capture video data of each of the speakers 130a-130n. Next, the step 396 may detect objects in the vehicle 50. Next, the decision step 398 may determine if any of the detected objects obstruct the speakers 130a-130n. If not, the method 390 moves back to the step 394. If so, the method 390 moves to the step 400.

The step 400 may determine potential audio distorting characteristics that may occur from the obstructing objects. For example, a type of material, a size of an object, an amount of the speakers 130a-130n that are covered, the location of the speakers 130a-130n that are covered and/or a hollowness/density of the object causing the obstruction may be used to determine the potential audio distorting characteristics. Next, the step 402 calculates coefficients to adjust the audio output (of the signals AOUT_A-AOUT_N) to reduce the audio distortion created by the obstructions. For example, the coefficients may be generated to counteract potential distortion. Next the method 360 may move to the decision step 404.

The decision step 404 determines if an event has occurred (e.g., the event 260). If not, the method 390 moves back to the step 394. If so, the method moves to the step 406. The step 406 applies the calculated coefficients to the signal AUDIO (e.g., to counteract the distortions caused by the obstructions). Next, the step 408 outputs the adjusted directional audio event warning. Next, the step 410 ends the method 390.

The system 100 may be configured to prevent distortion of the sound waves 262a-262n. Since the sound waves 262a-262n may be generated to notify the driver 52 of a location of the event 260, potential distortions caused by objects obstructing the speakers 130a-130n may affect the sound field. One or more of the capture devices 102a-102n configured to capture an interior of the vehicle 50 may be implemented to detect objects that may be obstructing the speakers 130a-130n. The processors 106a-106n may be configured to detect the size, type and/or structure of the objects obstructing the speakers 130a-130n to adjust the audio output to correct a potential distortion. In some embodiments, the capture devices 102a-102n may capture a location of the driver 52 (or other occupants of the vehicle 50) in order to correlate the location of the event 260 with a location of the driver 52 within the vehicle 50.

The system 100 may combine event information from an event detection system and/or warning system. The system 100 may be implemented within a surround sound audio system 130a-130n. The system 100 may be used in a typical vehicle driving scenario.

The detection portion may be implemented using any method that provides event indication and/or real world location including radar, visual sensors, ultrasound, etc. The event(s) 260 may be detected by using real world coordinate and/or direction information that may indicate where the event(s) 260 occur in relation to the vehicle 50. The information may be mapped and/or correlated to provide audible information (e.g., the sound waves 262a-262n) to the user 52.

The system 100 may operate as a surround sound warning system by taking event information (including correlation location information) and sending out a notification through the speakers 130a-130n. Different volume and/or phase variations may be presented on each of the speakers 130a-130n to notify the user 52 of the location, direction, proximity and/or urgency of an event.

In an example case of a vehicle collision warning system, a notification may be sent to indicate a high risk object has been detected. For example, if a vehicle in the right lane tries to cut into a lane occupied by the vehicle 50 without keeping a safe distance, the system 100 may determine an event has been detected. The system 100 may then convert the location information from the event to spatial audio data used to generate an audible surround sound warning to notify the driver 52 of both what the event is and where the event is located compared to the driver 52. The driver 52 may then know the direction and/or distance of the potential risk when receiving the audible warning, without distracting the visual attention of the driver 52.

In case where the system 100 is operational to detect a blind spot, an audible notification may be generated after detecting an object in a blind spot of the vehicle 50. For example, if an object is detected as an event in the right rear blind area of the vehicle 50, the system 100 may convert the location information from the event into an audible surround sound warning to notify both what the event is (e.g., the event type and/or classification) and where the event is (e.g., with respect to the vehicle 50). The operator 52 may be warned of the direction and/or distance of the object in a blind area based on the received audible warning.

The system 100 may operate with various inputs and/or processes, such as sensor fusion. The system 100 may provide the driver 52 both the direction and the distance of an event in an audible warning. The system 100 may operate to detect an approaching object. The system 100 may also detect an 'event' defined by the methods described in connection with FIGS. 7-10. The event detection may be generated in response to sensor fusion (e.g., combining data from various sources including computer vision, radar, LIDAR, ultrasound, etc.). For example data readings used to determine a location and/or classification of the event 260 may comprise computer vision results, sensor readings from the sensors 114 and/or other data. The final output of the system 100 may be an audible indication presented through multiple speakers 130a-130n. The speakers 130a-130n may provide a surround sound warning that indicates an event direction and/or distance.

The functions performed by the diagrams of FIGS. 7-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive data readings generated by a plurality of sensors; and
a processor configured to (a) perform a fusion operation on said data readings from said plurality of sensors to detect an event, (b) determine a location of said event with respect to a vehicle based on said data readings, (c) convert said location to spatial audio data and (d) generate an audio warning signal based on said spatial audio data, wherein (i) at least one of said sensors generates video data as one of said data readings, (ii) said processor performs video analysis on said video data to calculate measurements using a number of pixels to said event with respect to said vehicle to calculate said location, (iii) said spatial audio data is in a format compatible with a surround sound speaker system of said vehicle, (iv) said audio warning signal indicates said location of said event using said surround sound speaker system, (v) said fusion operation makes inferences from said plurality of sensors not possible from one of the sensors alone, (vi) said spatial audio data is configured to correlate said location of said event to a user location within said vehicle, (vii) one of said sensors comprises an interior camera and (viii) said processor is further configured to analyze video data from said interior camera to determine said user location.

2. The apparatus according to claim 1, wherein said spatial audio data is implemented to map said location of said event to a spatial audio effect capability of said surround sound speaker system.

3. The apparatus according to claim 2, wherein said spatial audio effect capability of said surround sound speaker is implemented to represent a direction and distance of said event.

4. The apparatus according to claim 1, wherein said spatial audio data is configured to provide a volume and a phase to each speaker of said surround sound speaker system.

5. The apparatus according to claim 4, wherein said volume is increased as an amount of risk caused by said event is increased.

6. The apparatus according to claim 1, wherein said sensors comprise one or more of a video capture device, radar, LIDAR, and ultrasound.

7. The apparatus according to claim 1, wherein said audio warning signal is configured to implement a vehicle collision warning.

8. The apparatus according to claim 1, wherein said event comprises at least one of (a) another vehicle closer than a pre-determined distance from said vehicle and (b) a pre-determined time to collision determined by said apparatus.

9. The apparatus according to claim 1, wherein (i) said processor is configured to determine a type of said event based on said fusion operation and (ii) said audio warning signal is generated based on said type of said event.

10. The apparatus according to claim 1, wherein (i) said event is a second vehicle in a blind spot of said vehicle, (ii) said audio warning signal is played back continuously while said second vehicle is in said blind spot and (iii) said spatial audio data is adjusted in real-time in response to a movement of said second vehicle while said audio warning signal is played back.

11. The apparatus according to claim 1, wherein said fusion operation is configured to (a) aggregate said data readings from each of said sensors and (b) interpret said aggregated data readings to determine a confidence level about said event.

12. The apparatus according to claim 1, wherein said sensors comprise a plurality of video capture devices configured to capture a surround view of said vehicle.

13. The apparatus according to claim 1, wherein said fusion operation is configured to (i) perform a comparison operation of said location determined using said video data and another location determined using said data readings from other of said sensors and (ii) determine a reliability of said location based on said comparison operation.

14. The apparatus according to claim 1, wherein a playback of said audio warning signal is configured to override audio settings of said surround sound speaker system.

15. The apparatus according to claim 1, wherein (a) one of said sensors comprises an interior camera, (b) said processor is further configured to analyze video data from said interior camera to detect objects obstructing one or more speakers of said surround sound speaker system and (c) said processor adjusts said spatial audio data to reduce a distortion of playback of said audio warning signal caused by said objects.

* * * * *